United States Patent [19]

Lang et al.

[11] 4,456,087

[45] Jun. 26, 1984

[54] VEHICLE POWER STEERING APPARATUS

[75] Inventors: Armin Lang, Schwäbisch Gmünd; Walter Cerny, Mutlangen, both of Fed. Rep. of Germany

[73] Assignee: Zahnradfabrik Friedrichshafen, AG., Friedrichshafen, Fed. Rep. of Germany

[21] Appl. No.: 414,465

[22] Filed: Sep. 2, 1982

[30] Foreign Application Priority Data

Sep. 16, 1981 [DE] Fed. Rep. of Germany ....... 3136708

[51] Int. Cl.³ .............................................. B62D 5/08
[52] U.S. Cl. ................................................... 180/142
[58] Field of Search ......................... 180/141, 142, 143

[56] References Cited

U.S. PATENT DOCUMENTS

| 3,777,839 | 12/1973 | Uchiyama et al. | 180/142 |
| 3,820,619 | 6/1974 | Ezoe et al. | 180/142 |
| 4,300,650 | 11/1981 | Weber | 180/142 |
| 4,320,812 | 3/1982 | Takaoka et al. | 180/143 |

FOREIGN PATENT DOCUMENTS 2948228 6/1980 Fed. Rep. of Germany.
1379606 1/1975 United Kingdom.

OTHER PUBLICATIONS

Digital Design, Nov. 1979, pp. 78-79, "Designer's Notebook, A Watch Dog Circuit for μC-Based System", by Lionel Smith.

Primary Examiner—David M. Mitchell
Assistant Examiner—Kenneth R. Rice
Attorney, Agent, or Firm—Zalkind & Shuster

[57] ABSTRACT

A valve is intermittently actuated under control of speed dependent signals to influence operation of an auxiliary power steering system. Digital speed signals from a sensor are processed in a microprocessor storing steering function data for transmission by an interfacing stage to an electromagnetic actuator for the valve.

10 Claims, 7 Drawing Figures

FIG. 5
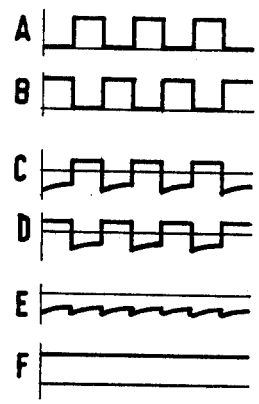
FIG. 6
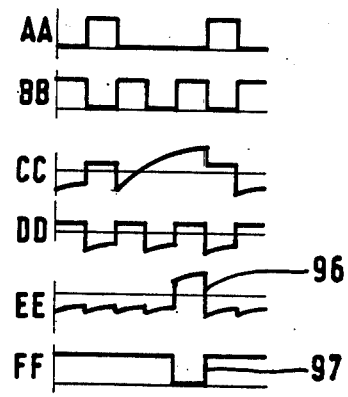
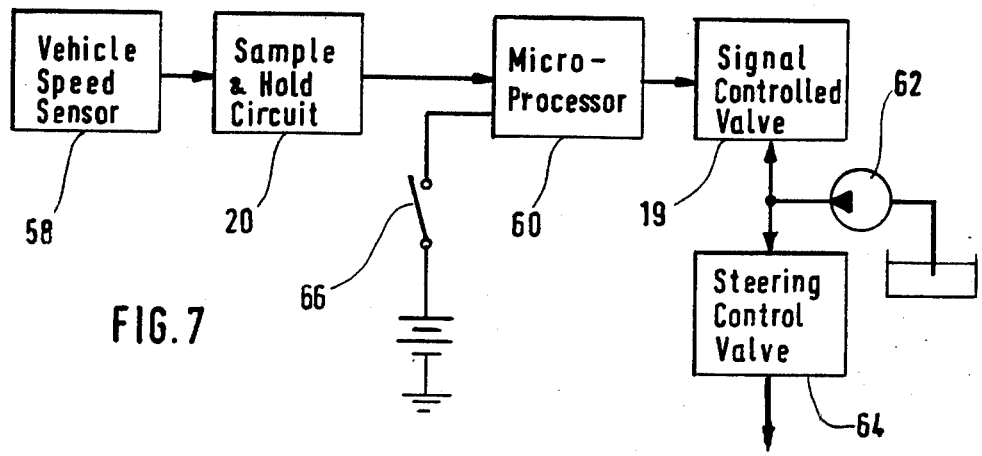
FIG. 7

VEHICLE POWER STEERING APPARATUS

BACKGROUND OF THE INVENTION

This invention relates to fluid flow control through an electromagnetically actuated valve in a vehicle power steering system for speed dependent adjustment of standby type of auxiliary power steering arrangement.

The provision of a flow control system for use in power steering is already known as disclosed in German patent publication OS No. 29 48 228. In such prior art system, a step motor is energized under control of speed of travel to effect adjustment of a flow restrictor. A speed sensor delivers a digital signal for such purpose which is initially converted into analog form and by means of a Schmitt trigger utilized with different switching thresholds to exercise the speed dependent control function. The circuitry and associated electronic components necessary for the switching operations is very costly and not suited for large scale production.

According to British Pat. No. 1,379,606, a speed dependent control arrangement for power steering is disclosed wherein two solenoid valves of the open or closed types are utilized for converting speed responsive electrical signals into fluid flow control operations through four switching positions of the valves. The latter prior art arrangement is however relatively inflexible and not adaptable to different functional characteristics associated with various fluid power steering installations.

It is therefore an important object of the present invention to provide speed dependent power steering systems which differ in speed control influence, with a simplified, flexible and less costly control arrangement for the fluid flow controlling device associated therewith. A further object is to provide a simple and safe apparatus for controlling the fluid circuits of power steering systems with different operational characteristics in accordance with vehicle speed dependent signals from a speed sensor, wherein speed sensor failure will not prevent continued functioning of the power steering system. Yet another object is to provide such speed control apparatus which will function with relatively little heat development.

SUMMARY OF THE INVENTION

In accordance with the present invetion, digital pulses derived from the vehicle speed sensor are processed in a digital electronic microprocessor interfaced with the electromagnetic actuator of a control valve that is intermittently operated as a function of vehicle speed to exert its speed dependent influence on the fluid power steering system. Control valve operation is accordingly effected with any operating voltage and with minimal energy losses in the interfacing stage between the microprocessor and the valve actuator thereby avoiding the need for any heat dissipation. A monitoring circuit connected to the microprocessor avoids memory loss in the event of speed sensor failure so that control operations may be resumed in a safe manner.

BRIEF DESCRIPTION OF DRAWING FIGURES

The invention will be described in detail with respect to specific embodiments by way of example, reference being made to the accompanying drawings, wherein:

FIG. 5 is a graphical diagram corresponding to normal operation of the microprocessor;

FIG. 6 is a graphical diagram corresponding to a malfunctioning microprocessor; and FIG. 7 is a block diagram showing the speed dependent power steering control system with which the invention is associated.

DETAILED DESCRIPTION OF PREFERRED EMBODIMENTS

Figure 1:
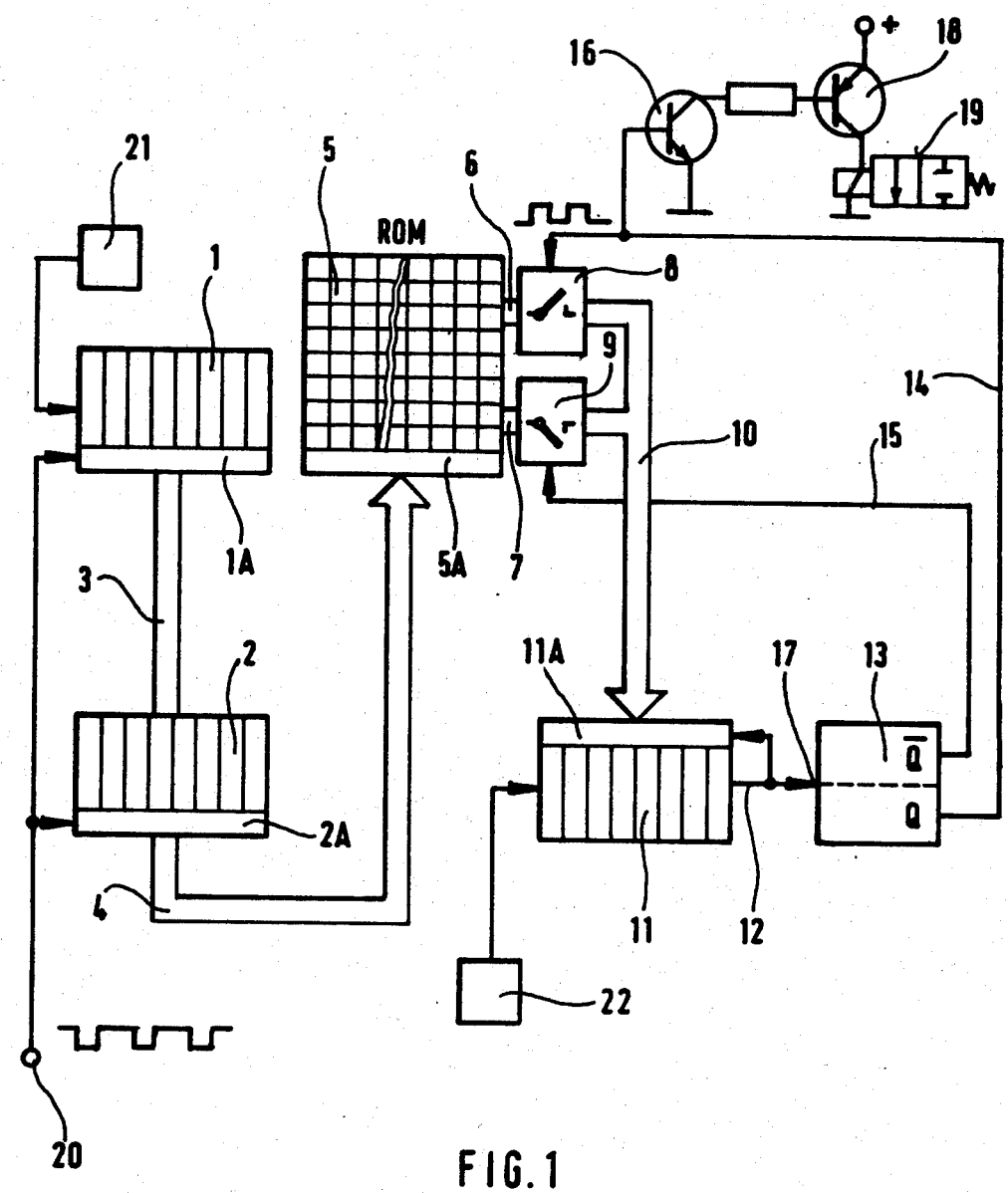
FIG. 1 is a block circuit diagram of a microprocessor circuit and associated control valve interfaced therewith in accordance with one embodiment of the invention.

Referring now to the drawings in detail, FIG. 7 schematically illustrates part of a typical speed sensitive fluid power steering system with which the present invention is associated. A vehicle speed sensor 58 such as a speedometer feeds an output to a sample and hold circuit 20 from which a digital pulse signal is obtained as an inverse function of vehicle speed. The digital speed signal is fed to a microprocessor 60 through which intermittent operation of a signal controlled valve 19 adjusts flow characteristics of fluid supplied by servo pump 62 to a steering control valve 64. Vehicle speed dependent steering operation is thereby effected upon closing of the vehicle ignition switch 66.

In accordance with one embodiment of the invention, processing of the digital speed signal from circuit 20 in the microprocessor 60 is accomplished by an arrangement as shown in FIG. 1. The microprocessor arrangement includes a read only memory (ROM) 5 within which tabulated data is stored based on the functional relationship between the speed dependent signal input from circuit 20 and the desired fluid pressure signal control to be exercised by actuation of valve 19. Read only memory 5 is controlled through its signal input portion 5A by signals fed thereto through data bus 4 connected to the set portion 2A of an intermediate data storage component 2 which is interconnected by bus 3 to the reset entry portion 1A of an up-counter 1.

The digital input signal source or circuit 20 feeds a cyclic pulse shaped signal as shown in FIG. 1 having a signal period duration inversely proportional to vehicle speed. This input signal is fed by a pulse signal line to the setting portion 2A of intermediate data storage 2 for clearing of data therefrom in preparation for reception of data through bus 3 from counter 1. The counter performs an up count operation at a constant timing pulse frequency dependent on the pulse input from a clock 21 to measure the period duration of the pulse signal input from source 20. At the end of the period of the pulse input signal, the counter is reset through its reset portion 1A. Thus, in the absence of any input signal, no new pulse signal data is stored in the intermediate storage 2 for addressing the memory 5 with vehicle speed information.

The outputs 6 and 7 of memory 5 provide pulse and space ratio information through which operation of the valve 19 is controlled based on the pulse width and pulse spacing interval information in the input received in memory 5. Such data is appropriately expanded in memory 5 in accordance with the tabulated data stored therein for high resolution control of the valve 19 by alternate supply of output pulses through buffers 8 and 9 to a common bus 10 connected to the input portion 11A of a pulse length counter 11 to which constant frequency pulses are fed by a clock 22. The pulse width and pulse spacing intervals in the speed dependent signal input are accordingly measured by counter 11 by counts terminated with an output pulse in line 12 causing reset of the counter and toggling of a bistable flip-flop switch 13. The buffers 8 and 9 are switched between the open and closed conditions by feedback of output pulses in lines 14 and 15 from the flip-flop 13 when toggled, to synchronize the alternate transmission of memory readout from outputs 6 and 7 of memory 5. The output in line 14 from flip-flop 13 also corresponds to the drive signal for the valve 19 applied to the input base of an interface transistor 16 having an output collector coupled by a resistor to the input base of a driver transistor 18. The output collector of transistor 18 is connected to the electromagnetic actuator of valve 19 as shown.

The tabular information stored in memory 5 is designed to adapt the non-linear characteristics of the control signal output of valve 19 to various conditions of vehicle steering as well as to take into account the reciprocal relationship between vehicle speed and pulse length of the input speed dependent signal. In order to process speed signals within a useful speed range with satisfactory precision, counter 1 and memory 5 with corresponding operational data handling ranges must be selected.

Figure 2:
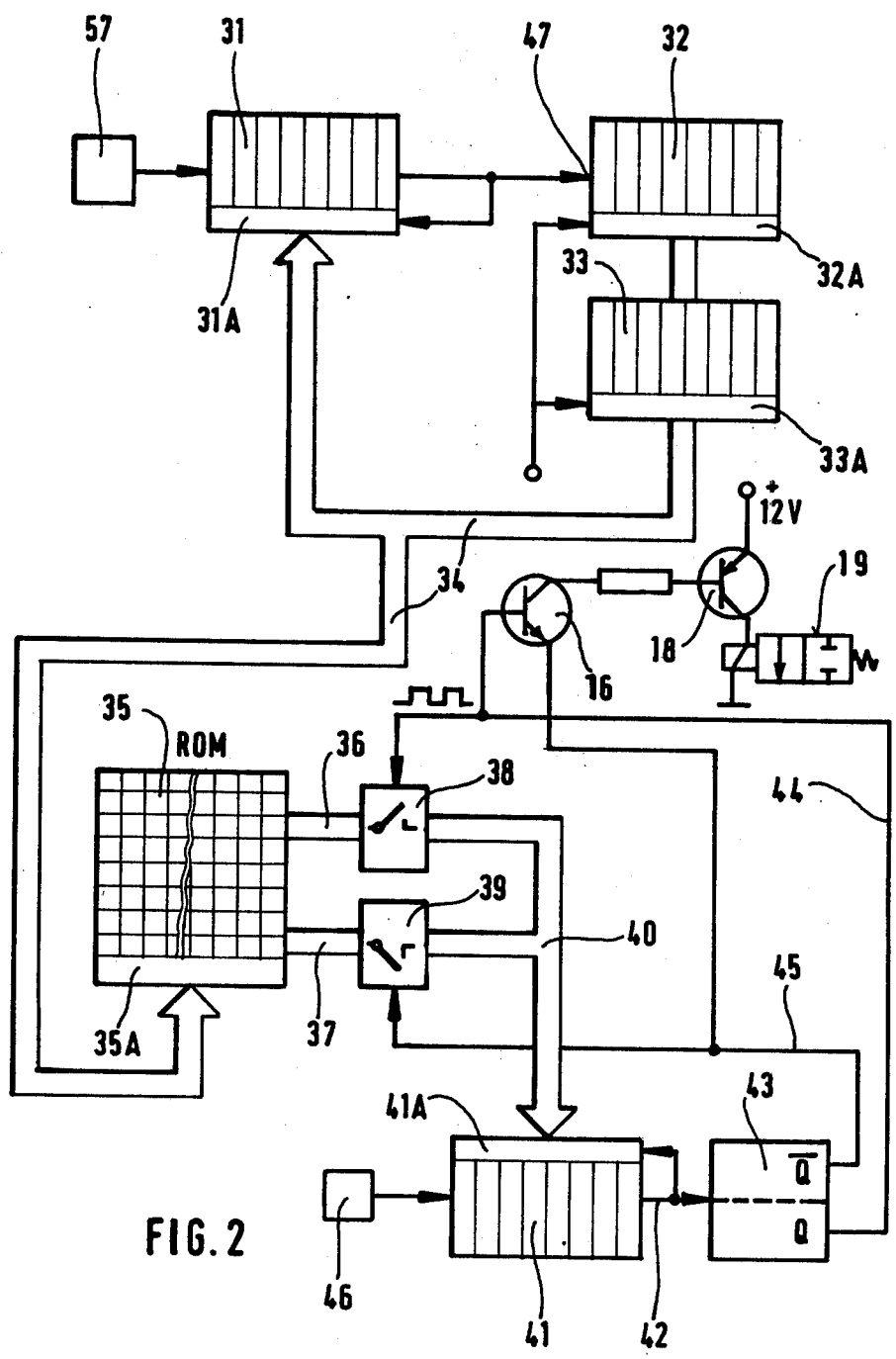
FIG. 2 is a block circuit diagram showing another embodiment.

Input signal processing within a predetermined speed range with satisfactory precision is achieved with another embodiment of the invention as shown in FIG. 2, by use of a frequency divider 31 receiving a timing signal from clock 57. The division factor of divider 31 is changed in accordance with data fed to its input portion 31A by bus 34 from an intermediate data storage 33 connected to the portion 32A of an up counter 32. Speed dependent pulse signals are fed to storage 33 and counter 32 as in FIG. 1. However, a variable frequency beat signal is applied to counter 32 at 47 from divider 31 to also reset the divider. The signal frequency thus decreases with an increase in input signal period duration to increase high speed resolution and thereby avoid enlargement of data storage in the ROM memory 35 to which data is fed by bus 34 from the intermediate storage 33. Output busses 36 and 37 connect memory 35 to buffers 38 and 39 alternately transmitting pulses to a common bus 40 connected to the input 41A of a pulse length counter 41 receiving timing pulses from clock 46. Counter 41 is connected by line 42 to flip-flop 43 through which lines 44 and 45 control the buffers 38 and 39. Contrary to the arrangement of FIG. 1, both lines 44 and 45 are respectively connected to the base and emitter of transistor 16 to form a logic circuit configuration wherein valve 19 is actuated only when the output Q of flip-flop 13 is high and output $\overline{Q}$ is low. Under any other logic conditions transistor 18 is held non-conductive so as to prevent supply of energizing current to the actuator of valve 19. The possibility of defective control operation is thereby reduced.

Figure 3:
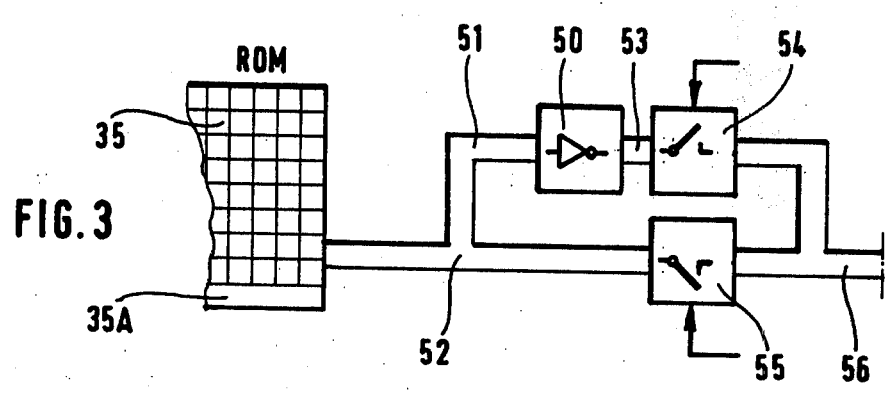
FIG. 3 is a partial block diagram showing a modification of the embodiment shown in FIG. 2.

FIG. 3 illustrates a modification of the arrangement shown in FIG. 2 wherein the full capability of the memory 35 is utilized by providing a signal inverter 50 between one output bus 52 thereof and buffer 54 through which a computed pulse interval signal is transmitted as a complement of the pulse time signal transmitted through buffer 55 connected directly to bus 52. The signals passed by both buffers 54 and 55 are transmitted by a common bus 56 to the pulse length counter 41 as described with respect to FIG. 2.

Figure 4:
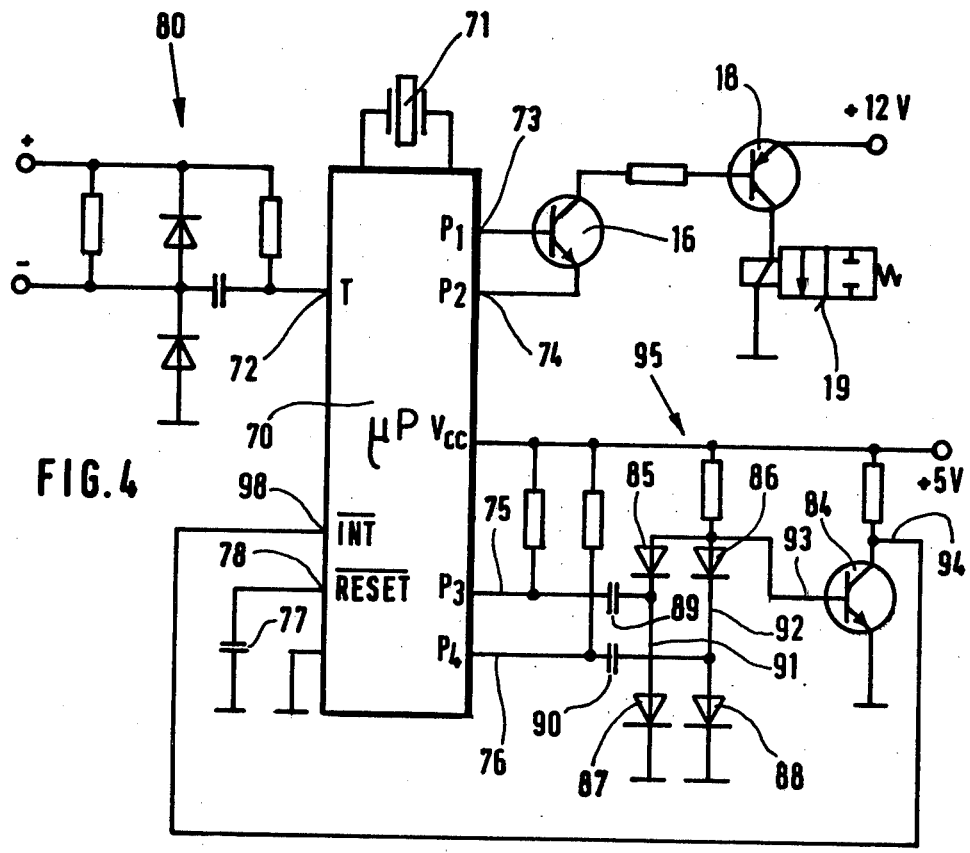
FIG. 4 is a block circuit diagram showing yet another embodiment of the invention.

FIG. 4 illustrates another embodiment in which the microprocessor corresponding to the arrangements hereinbefore described, is in the form of a controller chip 70 having an input terminal 72 to which the vehicle speed dependent signal is fed through a protective RC input circuit 80. The controller 70 is programmed to deliver the Q and $\overline{Q}$ flip-flop signals at output terminals 73 and 74 to the transistor 16 as described with respect to FIG. 2. The beat frequency signals utilized for operation of the microprocessor are derived from a quartz crystal 71. Operation is initiated preferably upon closing of the vehicle ignition switch 66 by supply of voltage to input terminal 78 through capacitor 77 in a manner well known in the art.

Signal controllers of the same general type as 70 with reset and interrupt terminals 78 and 98 and HIGH/LOW output terminals 75 and 76 are well known. Monitoring circuits for such controllers are also known as disclosed, for example, in the journal "Digital Design", November 1979, pages 78 and 79. According to such prior art arrangements a freely vibrating oscillator is connected to the reset terminal of the controller and the oscillater is prevented from operation whenever an AC voltage is applied to the monitoring circuit to prevent the controller from going out of synchronism. In the present case, the controller could so malfunction because of uncontrolled voltage disturbances, field irradiation, and interference voltage peaks producing unintentional command signals. Prior art monitoring circuits are not, however, reliable in preventing such controller malfunction.

A monitoring circuit 95 is shown in FIG. 4 connected to the output terminals 75 and 76 of the controller 70 from which bit pattern pulses A and B as depicted in FIG. 5, are fed through capacitors 89 and 90 to a rectifier bridge including diodes 85, 86, 87 and 88 to develop pulses in lines 91 and 92 respectively labeled C and D in FIG. 5. As a result, pulses appear in line 93 labeled E in FIG. 5. The pulses E applied to the base of a transistor 84 are negative going to hold the transistor non-conductive so that its collector is normally maintained high by a positive voltage continuously applied thereto. Defective operation of the controller 70 results, for example, in pulses AA and BB at terminals 75 and 76 as shown in FIG. 6, different from the normal pulses A and B as shown in FIG. 5. Pulses CC, DD and EE are accordingly produced in lines 91, 92 and 93, respectively. The pulses EE thus apply a turn-on signal 96 to the base of transistor 84 to produce a pulse 97, as shown in FIG. 6, at the collector of the transistor 84. The pulse 97 is applied to the interrupt terminal 98 of the controller 70 through line 94 to cause the controller to return to its normal operating routine. At the same time data previously stored in the controller is preserved for steering control since the controller is not reset. Thus, no stored data will be lost should there be any speedometer failure.

What is claimed is:

1. In a fluid power steering system for a vehicle having a speed dependent signal source and an electromagnetically actuated valve (19) through which speed responsive adjustment of the system is effected, the improvement comprising means (20) connected to said source for producing speed dependent signal pulses, means for digitally processing said signal pulses, and interface means connecting the digital processing means to the electromagnetically actuated valve for intermittent operation thereof as a function of vehicle speed, the digital processing means including input counter means (1, 32) connected to the pulse producing means for measuring pulse duration and spacing of the signal pulses, intermediate storage means (2, 33) connected to the input counter means for temporarily storing the count measurements thereof, memory means (5, 35) connected to the storage means for transforming the measurements of the counter means into outputs in accordance with stored functions, a pulse length counter (11, 41), a pair of buffers (8, 9, 38, 39) transmitting the outputs of the memory means to the pulse length counter, and flip-flop means (13, 43) controlled by the pulse length counter for operation of the valve (19) through the interface means (16, 18).

2. The improvement as defined in claim 1 including signal frequency dividing means (31) interconnected between the pulse producing means and the input counter means (32) for varying the frequency of the signal pulses fed thereto.

3. The improvement as defined in claim 2 including signal feedback means (14, 15, 44, 45) operatively connecting the flip-flop means (13, 43) to the buffers (8, 9, 38, 39) for opening and closing thereof.

4. The improvement as defined in claim 3 including an inverter (50) connecting the memory means (35) to one of the buffers (54).

5. The improvement as defined in claim 4 wherein the interface means (16, 18) is connected by the feedback means to the flip-flop means.

6. The improvement as defined in claim 1 including signal feedback means (14, 15, 44, 45) operatively connecting the flip-flop means (13, 43) to the buffers (8, 9, 38, 39) for opening and closing thereof.

7. The improvement as defined in claim 6 wherein the interface means (16, 18) is connected by the feedback means to the flip-flop means.

8. The improvement as defined in claim 1 including an inverter (50) connecting the memory means (35) to one of the buffers (54).

9. In a fluid power steering system for a vehicle having a speed dependent signal source and an electromagnetically actuated valve (19) through which speed responsive adjustment of the system is effected, the improvement comprising means (20) connected to said source for producing speed dependent signal pulses, means for digitally processing said signal pulses, and interface means connecting the digital processing means to the electromagnetically actuated valve for intermittent operation thereof as a function of vehicle speed, the digital processing means comprising a microprocessor (70) having pulse output and interrupt terminals (75, 76, 98), and monitoring circuit means (95) connected to said terminals for preventing malfunction of the microprocessor.

10. The improvement as defined in claim 9 wherein said monitoring circuit means includes a bridge (85, 86, 87, 88).

* * * * *